(12) United States Patent
Li et al.

(10) Patent No.: US 7,659,683 B2
(45) Date of Patent: Feb. 9, 2010

(54) RESONANT FREQUENCY IDENTIFICATION

(75) Inventors: Zhengrong Li, Zhe Jiang Province (CN); Wei Qian, Shanghai (CN); Peter B. Schmidt, Franklin, WI (US); Sang Hoon Lee, Yongin (KR)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 207 days.

(21) Appl. No.: 11/669,048

(22) Filed: Jan. 30, 2007

(65) Prior Publication Data
US 2008/0183308 A1    Jul. 31, 2008

(51) Int. Cl.
*G05B 11/01* (2006.01)

(52) U.S. Cl. .................. 318/629; 318/611; 318/616; 318/606

(58) Field of Classification Search .................. 318/329, 318/616, 617, 696, 606, 611, 607, 608, 254.1
See application file for complete search history.

(56) References Cited

U.S. PATENT DOCUMENTS

| | | | | |
|---|---|---|---|---|
| 4,219,767 A | * | 8/1980 | Wimmer | 318/696 |
| 6,144,181 A | * | 11/2000 | Rehm et al. | 318/629 |
| 6,211,640 B1 | * | 4/2001 | Fujisaki et al. | 318/636 |
| 6,417,982 B1 | * | 7/2002 | Ottesen et al. | 360/77.02 |
| 6,597,146 B1 | * | 7/2003 | Rehm et al. | 318/632 |
| 6,822,415 B1 | * | 11/2004 | Komiya et al. | 318/629 |
| 6,850,021 B1 | * | 2/2005 | Golownia et al. | 318/432 |
| 7,170,251 B2 | * | 1/2007 | Huang | 318/563 |
| 7,187,142 B2 | * | 3/2007 | Rehm | 318/400.04 |
| 7,291,999 B2 | * | 11/2007 | Huang | 318/563 |
| 7,417,386 B2 | * | 8/2008 | Piefer et al. | 318/85 |

* cited by examiner

*Primary Examiner*—Bentsu Ro
*Assistant Examiner*—Thai Dinh
(74) *Attorney, Agent, or Firm*—Turocy & Watson LLP; R. Scott Speroff

(57) ABSTRACT

Systems and methods that determine resonant frequencies of a motor system via employing an output of a velocity regulator. The velocity regulator enables the motor drive to command the rotation of the motor at predetermined rotations, by setting rotational speeds of the motor. The output of the velocity regulator can then be stored as a function of time, and a Fast Fourier Transform performed on such time data to obtain a frequency data and a signal power spectrum.

30 Claims, 10 Drawing Sheets

RESONANT FREQUENCY IDENTIFICATION

TECHNICAL FIELD

The subject invention relates generally to industrial units with operating disturbances (e.g., electromechanical motors) and more particularly to identifying resonant frequency for such systems.

BACKGROUND

Typically, controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

Accordingly, a typical industrial controller functions as a special purpose processing device for controlling (e.g., via an automated and a semi-automated means) industrial processes, machines, manufacturing equipment, plants, and the like. Such controllers can execute a control program or routine in order to measure one or more process variables or inputs representative of a status of a controlled process and/or effectuate outputs associated with control of the process. For example, an output module can interface directly with a controlled process by providing an output from memory to an actuator such as a motor, drive, valve, solenoid, and the like. In distributed control systems, controller hardware configuration can be facilitated by separating the industrial controller into a number of control elements, each of which can perform a different function. Particular control modules needed for the control task can be connected together on a common backplane within a rack and/or through a network or other communications medium.

For example, various control modules can be spatially distributed along a common communication link in several locations. Data can be communicated with these remote modules over a common communication link, or network, wherein any or all modules on the network communicate via a common and/or an industrial communications protocol. Controllers within a control system can communicate with each other, with controllers residing in other control systems and/or with systems and/or applications outside of a control environment (e.g., business related systems and applications).

An industrial controller can be customized to a particular motor and industrial unit. Such motors typically produce disturbances that can adversely affect an operation of the motor. Accordingly, identification of resonant frequencies for such motors can become critical for proper operation of the industrial system. Typically, operation around the resonant frequency can cause unpredictable and uncontrollable motor movement. For example, such identification methods are typically based on delayed and noisy motor speed measurement, which degrade the accuracy of resonant frequency identification and resonance compensation.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject invention provides for systems and methods that identify resonant frequency of an industrial motor via measuring an output of the velocity regulator associated with a motor drive of the industrial motor. By employing such output of the velocity regulator for resonant frequency identification—(as opposed to other signals such as the velocity feedback signal)—inaccuracies such as those from gain amplifications, filtering and the like can be mitigated, to clearly indicate the resonant frequency of the system. The velocity regulator enables the motor drive to command the rotation of the motor at predetermined rotations, by setting rotational speeds of the motor, for example. Likewise, a current regulator of the motor drive can set a torque of the motor, wherein the current regulator can act as the primary inner loop and that needs to be controlled followed by the velocity regulator. The motor and the drive can be coupled via two cables (e.g., an internal coupling via a power cable and the feedback cable)

According to a methodology of obtaining a signal power spectrum and resonant frequency in accordance with an aspect of the subject innovation, an excitation signals (e.g., sinusoidal varying signal) can be applied to the motor via the drive, and a velocity feedback can then be measured (e.g., in a closed loop). The output of the velocity regulator can then be stored as a function of time, and a Fast Fourier Transform (FFT) performed on such time data to obtain a frequency data and a power signal spectrum. By employing the identified resonant frequencies for the motor, an associated controller can suppress the disturbance caused by mechanical resonance with a compensator (e.g., a control bandwidth can be increased with suitable compensator for mechanical resonance).

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
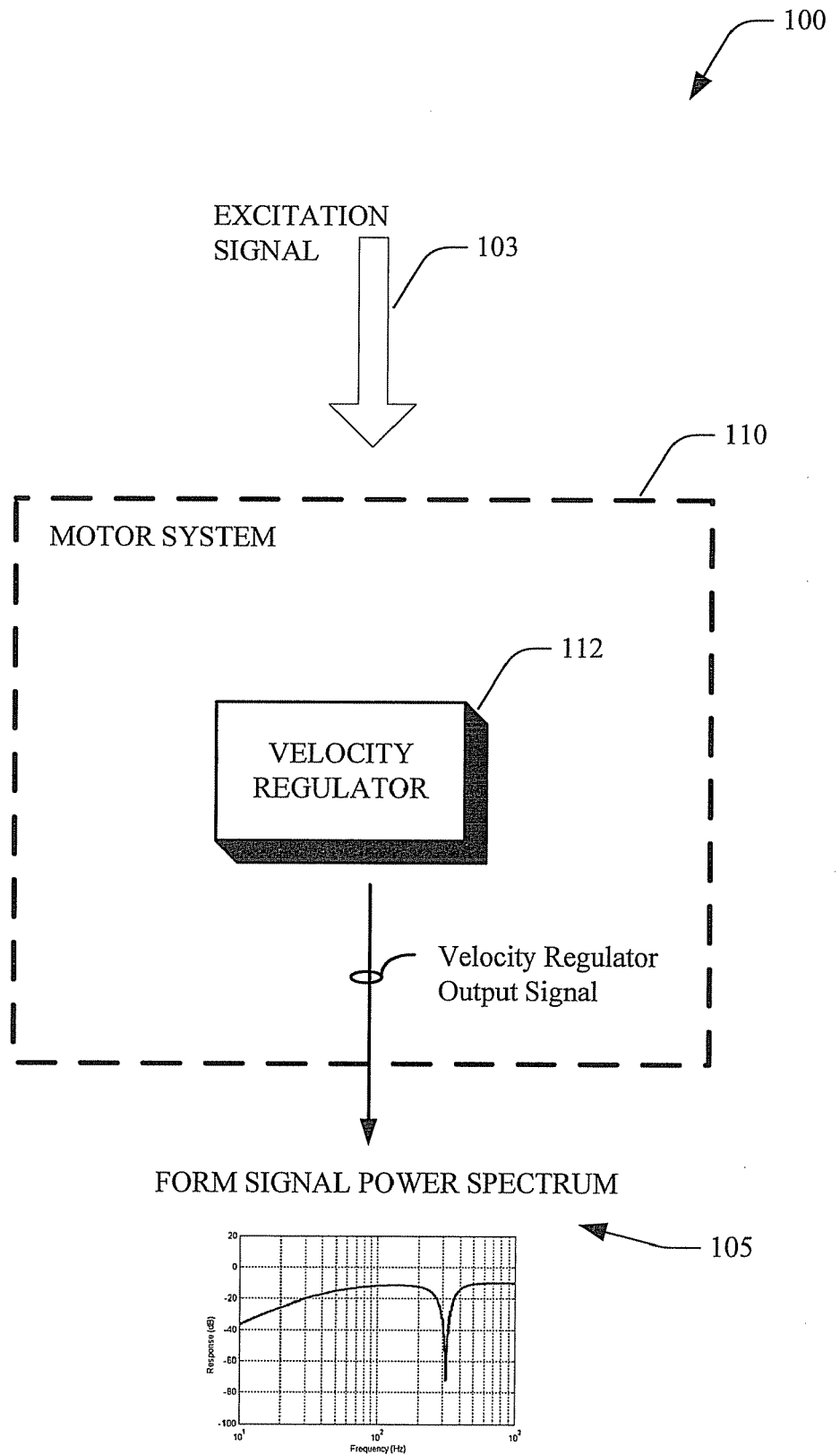
FIG. 1 illustrates a schematic block diagram of a system that determines a resonant frequency of a motor in accordance with an aspect of the subject innovation.

FIG. 1 illustrates an industrial system 100 that can determine a resonant frequency for a motor system 110 in accordance with an aspect of the subject innovation. An excitation signal 103 is applied to the motor system 110, and an output (e.g., an electrical signal) of a velocity regulator 112 can subsequently be measured. The excitation signal 103 can have a single frequency sinusoidal form, and associated time based data points for such applied frequency can be collected and time stamped, to subsequently form a single point in the frequency domain of the signal power spectrum 105. From such signal power spectrum 105, the resonant frequency of the motor system 110 can subsequently be obtained. For example, a form of closed-loop arrangement can be employed for the industrial system 100, so that the motor movement of the motor system 110 is predictable and controllable.

As will be described in detail infra with respect to transform functions, such as a Fast Fourier Transform (FFT), the derived resonant frequencies in accordance with an aspect of the subject innovation can correspond to the zeros of such transfer function (velocity regulator output as output; to velocity reference as input), hence the resonant frequencies can be accurately identified. In contrast to conventional techniques that employ motor velocity as output, the subject innovation employs output of velocity regulator (e.g., output in form of an electrical signal)—hence eliminating errors caused by motor velocity estimation and simplifying the resonant frequency identification process.

Figure 2:
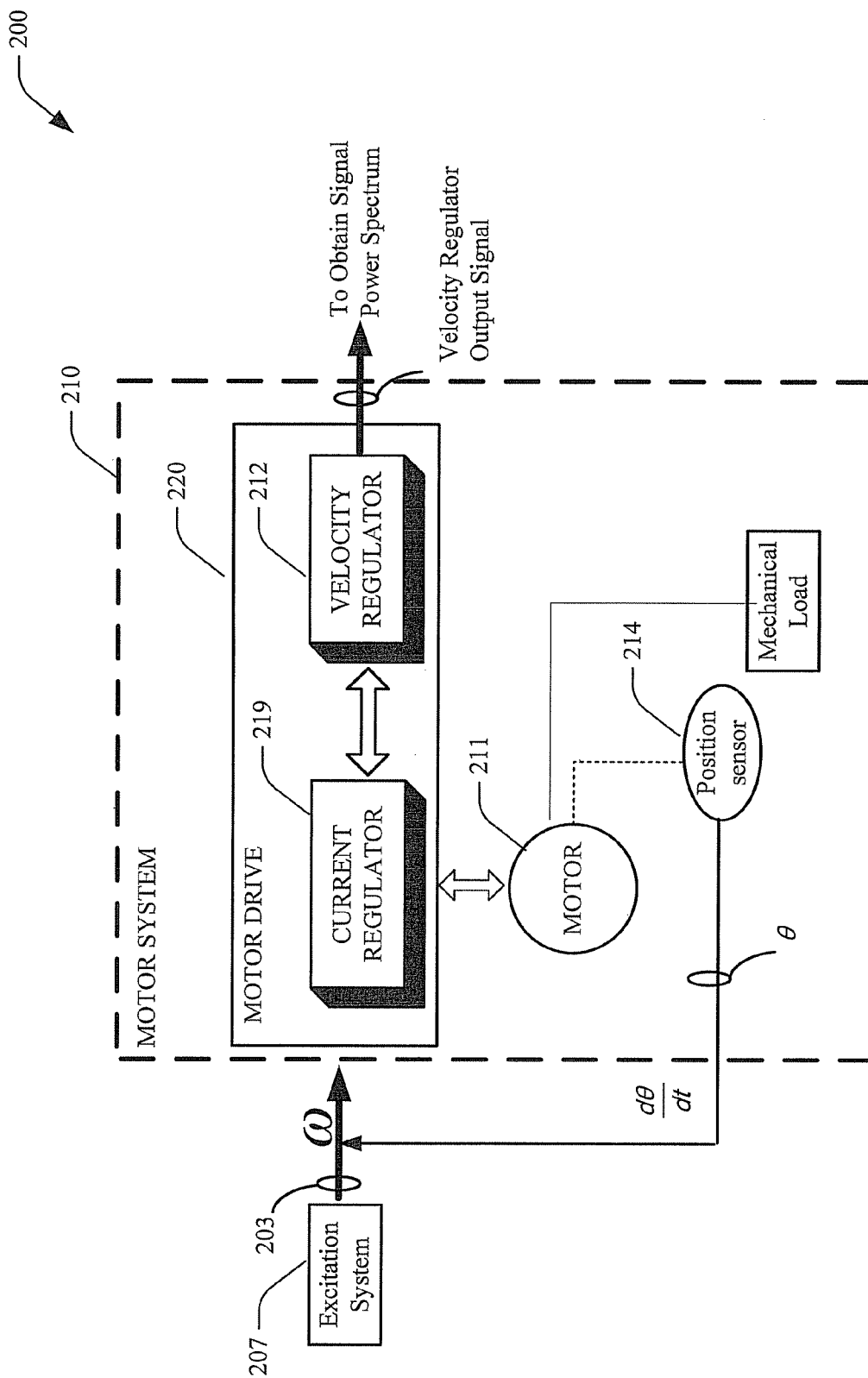
FIG. 2 illustrates a further block diagram for a resonant frequency detection system with a transformation component in accordance with an aspect of the subject invention.

FIG. 2 illustrates a further block diagram of a system 200 that identifies a resonant frequency of a motor system 210 in accordance with an aspect of the subject innovation. The motor system 210 includes a motor drive 220 that is operatively connected to a motor 211 with a position sensor 214. An excitation system 207 (e.g., an acceleration inducer) can apply a sinusoidal frequency signal 203 (that defines an angular frequency ω) to the motor system 210, wherein characteristics of the sinusoidal wave form, such as lowest desired frequency, highest desired frequency, amplitudes, number of incremental increase of frequency, and the like, can be defined and initiated by the excitation system 207 and applied to the motor system 210.

The velocity regulator 212 enables the motor drive to command the rotation of the motor 211 at predetermined rotations, by setting rotational speeds of the motor 211, for example. Likewise, a current regulator 219 of the motor drive 220 can set a torque of the motor 211, wherein the current regulator 219 can act as the primary inner loop and that needs to be controlled followed by control by the velocity regulator 212. Velocity feed back from the velocity regulator 212 is measured in a closed loop, wherein such output of the velocity regulator 212 can then be stored as a function of time, and a Fast Fourier Transform performed thereon, to obtain a frequency data and a power signal spectrum as described in detail infra.

Figure 3:
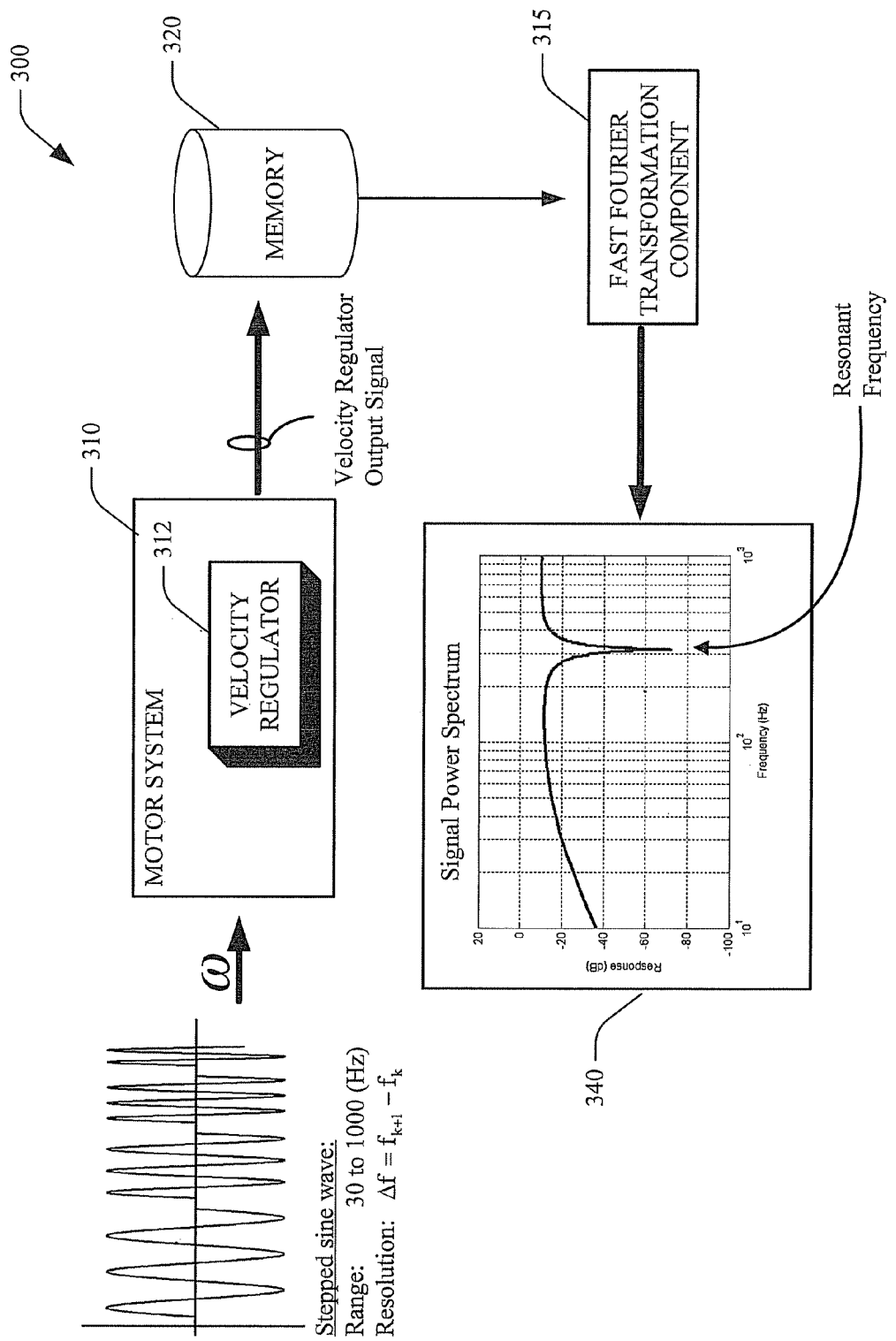
FIG. 3 illustrates a signal power spectrum for motor in accordance with an aspect of the subject innovation.

FIG. 3 illustrates a further aspect of the subject innovation wherein a system 300 employs a transformation component with a Fast Fourier Transform (FFT) function, which operates on time data for the output signal of the velocity regulator 312. For example, a single sinusoidal varying frequency can be applied to the motor system 310, through the drive and a velocity output of the velocity regulator 312 can then be measured. A memory 320 can store the output of the velocity regulator 312, which is time stamped (velocity regulator signals stamped as a function of time), via a stamp component, for example. Once the proper number of data points and/or forms of angular frequency ω have been stored in the memory 320, the Fast Fourier transform component 315 can operate on data stored in the memory 320.

In general, assuming that χ is a complex-valued Lebesgue integrable function. The Fourier transform to the frequency domain, ω, is given by the function:

$$X(\omega) = \frac{1}{\sqrt{2\pi}} \int_{-\infty}^{\infty} x(t) e^{-i\omega t} dt,$$

for every real number ω.

When the independent variable t represents time (with SI unit of seconds), the transform variable ω represents angular frequency (in radians per second). Other notations for this same function are: $\hat{\chi}(\omega)$ and $F\{\chi\}(\omega)$. The function can be complex-valued in general. (i represents the imaginary unit.) If X(ω) is defined as above, and χ(t) is sufficiently smooth, then it can be reconstructed by the inverse transform:

$$x(t) = \frac{1}{\sqrt{2\pi}} \int_{-\infty}^{\infty} X(\omega) e^{i\omega t} dt,$$

for every real number t.

The interpretation of X(ω) is aided by expressing it in polar coordinate form, $X(\omega) = A(\omega) \cdot e^{i\phi(\omega)}$, where:

$A(\omega) = |X(\omega)|$ the amplitude $\phi(\omega) = \angle X(\omega)$ the phase Then the inverse transform can be written:

$$x(t) = \frac{1}{\sqrt{2\pi}} \int_{-\infty}^{\infty} A(\omega) e^{i(\omega t + \phi(\omega))} d\omega$$

Such is a recombination of all the frequency components of χ(t). Each component is a complex sinusoid of the form $e^{i\omega t}$ whose amplitude is proportional to A(ω) and whose initial phase angle (at t=0) is φ(ω).

The Fast Fourier transform component 315 can obtain the stored time data from the memory 320 and supply the frequency data, for each frequency. For example, a one hertz signal can be applied and a plurality of time data points can be stored in the memory 320. The Fast Fourier transform component 315 can then operate on such collected data, to obtain a single signal in the power spectrum 340, and lead to the identification of the associated resonant frequency. Put differently, when a single excitation frequency signal is applied to the system/motor, a plurality of time based data (e.g., velocity regulator output) are collected and stored. In general, an FFT is then found by employing such data, which only produces a single point of frequency based data for the signal power spectrum. Hence, all other frequency based points that form the total plot of the signal power spectrum, are generated by all of the other single excitation frequencies that are applied. The single excitation frequencies can be applied in many ways such as; discrete steps, continuously swept, linear increments, logarithmic increments, and the like.

Figure 4:
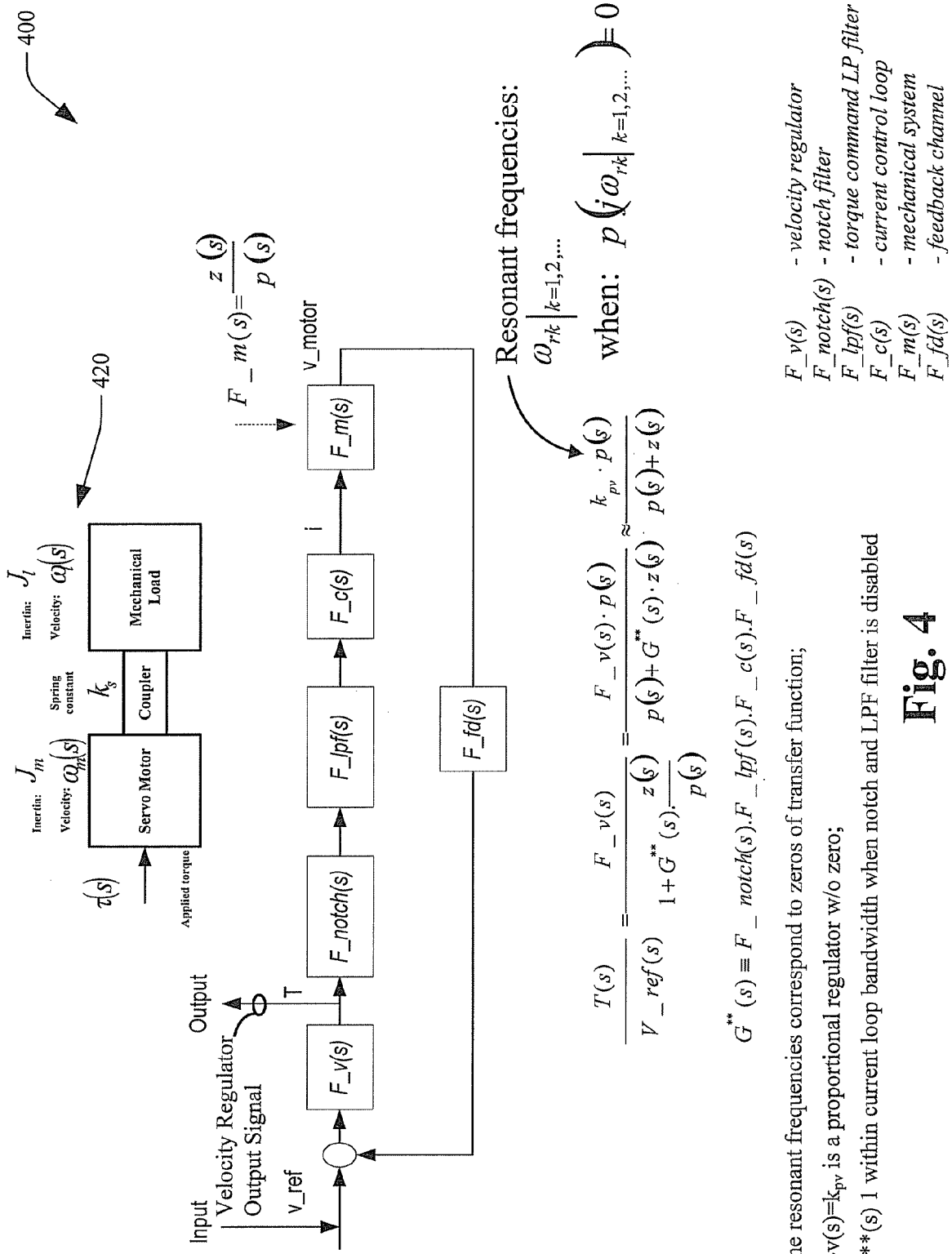
FIG. 4 illustrates an exemplary block diagram for system equivalents in accordance with a further aspect of the subject innovation.

FIG. 4 illustrates a functional block diagram 400 for a model of a dual inertia system in accordance with an aspect of the subject innovation. As illustrated, a closed-loop scheme can be formed, so that the motor movement is predictable and controllable. Within the system 400, resonant frequencies typically correspond to the zeros of the new transfer function: velocity regulator output (output) to velocity reference (input), and the resonant frequencies can be accurately identified. In general, for a dual inertia system 420; the transfer function can be represented by:

$$\frac{\omega_m(s)}{\tau(s)} = \frac{z(s)}{p(s)}$$

It is to be appreciated that the subject innovation, does not employ motor velocity as output, and hence eliminates errors caused by motor velocity estimation and simplifies the identification process.

Figure 5:
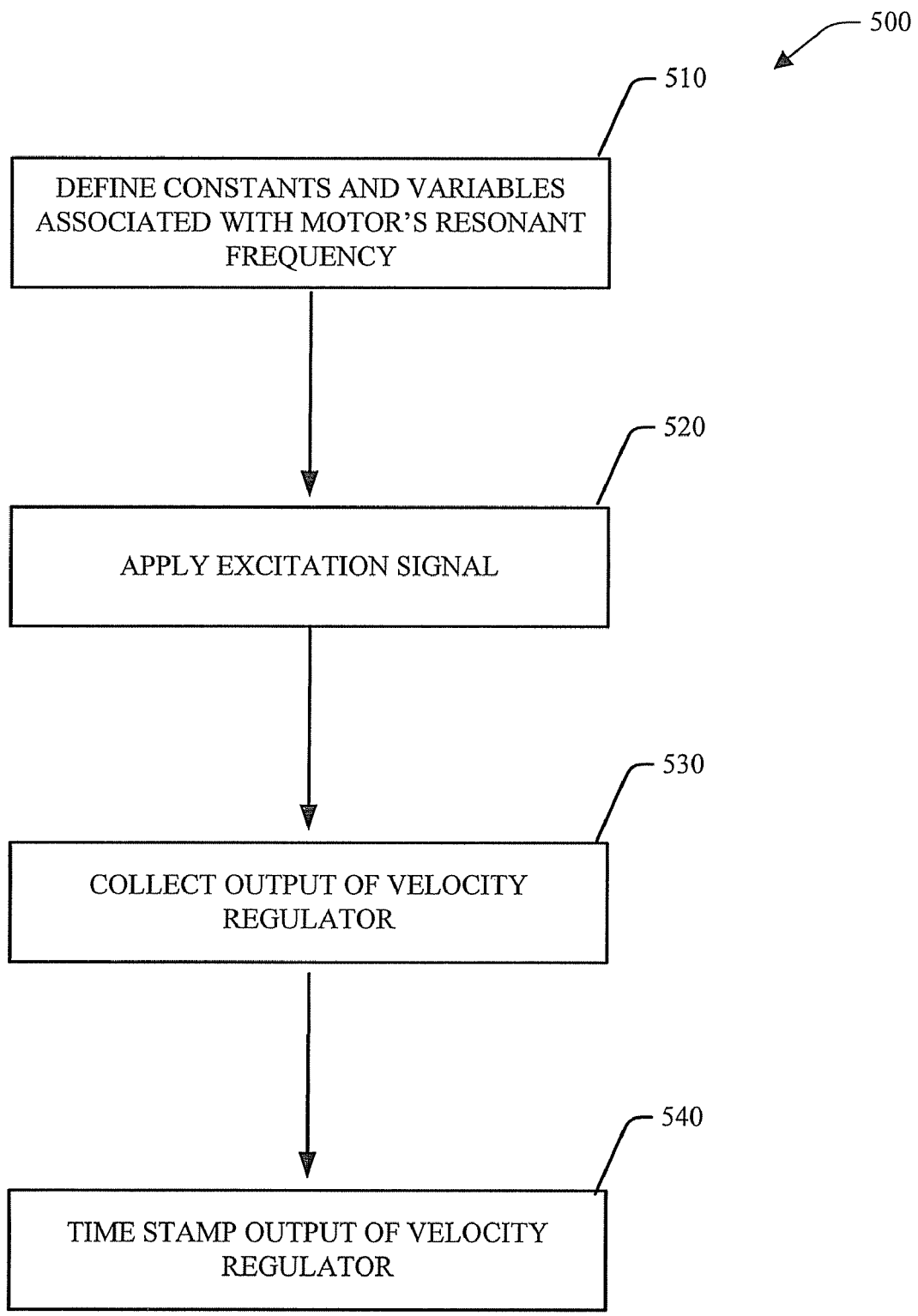
FIG. 5 illustrates a methodology of determining a resonant frequency according to a particular aspect of the subject innovation.

FIG. 5 illustrates a related methodology 500 of collecting outputs of a velocity regulator in accordance with an aspect of the subject innovation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially, and at 510 constants and variables that are associated with a motor's resonant frequency can be defined for the excitation system. Such can include defining data points to be collected, frequency range of interest, high and low frequencies, characteristics of the excitation signal and the like. Next and at 520 an excitation signal (e.g., a single sinusoidal varying frequency signal) can be applied to the motor for which its resonant frequency is desired. At 530, an output of the velocity regulator can be collected, wherein by employing such output of the velocity regulator for resonant frequency identification—(as opposed to other signals such as the velocity feedback signal)—inaccuracies such as those from gain amplifications, filtering and the like can be mitigated, to clearly indicate the resonant frequency of the system. At 540, a time stamp can be associated with output of the time velocity regulator to time stamp the data collected.

Figure 6:
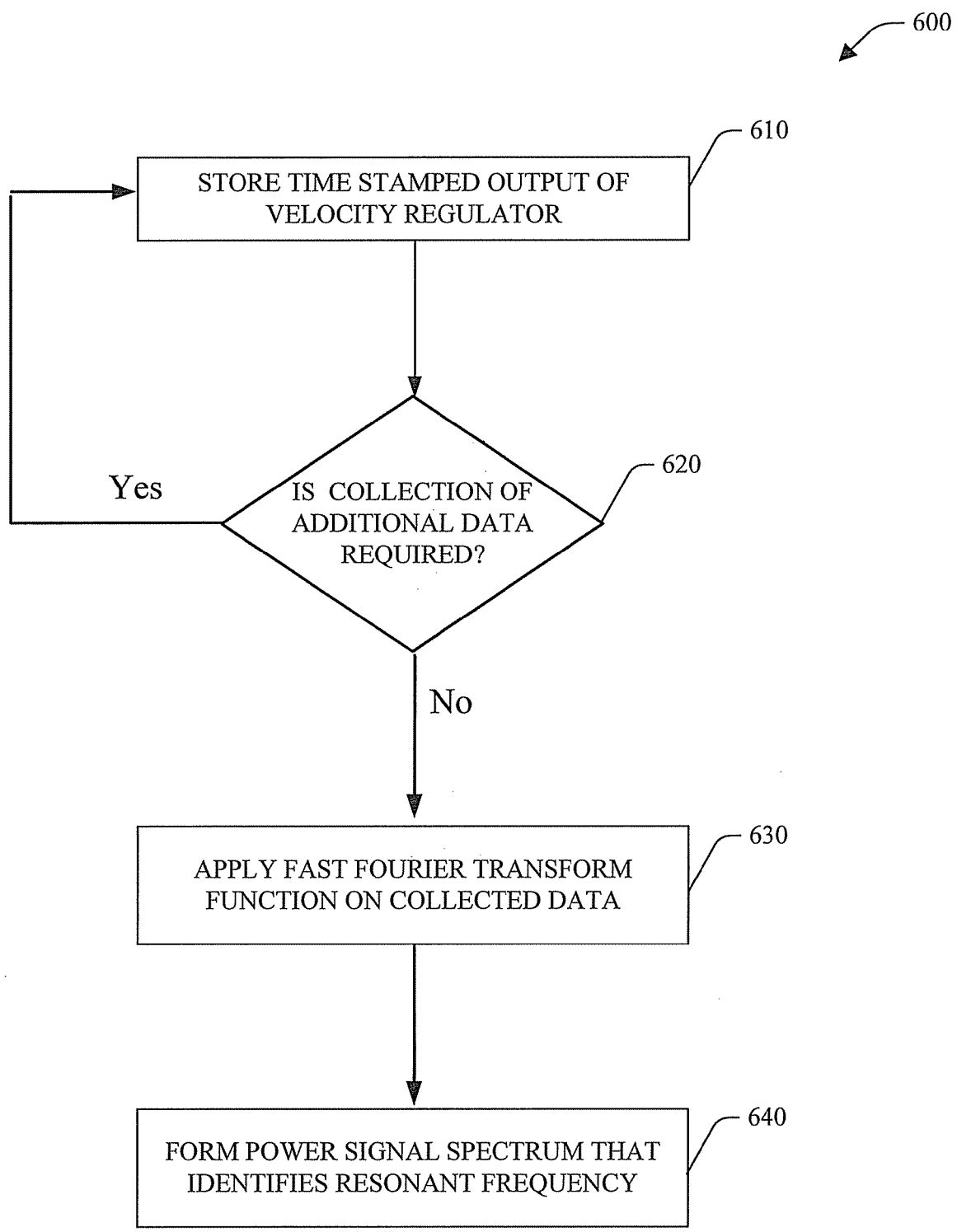
FIG. 6 illustrates a related methodology of obtaining a power signal spectrum according to an aspect of the subject innovation.

FIG. 6 illustrates a related methodology of forming a power signal spectrum for identifying resonant frequency, in accordance with an aspect of the subject innovation. Initially, and at 610 data collected from the velocity regulator, which has been time stamped, can be stored into a storage medium (e.g., a memory store). Next, and at 620 a determination is made as to whether additional data needs to be collected for obtaining the power spectrum signal. If not, the methodology proceeds to act 630 where a Fast Fourier Transform is performed on the time data, to supply frequency data for the excitation signal. Next and at 640, a power signal spectrum can be created (via performing the FFT for a plurality of signals) that identifies the resonant frequency.

Figure 7:
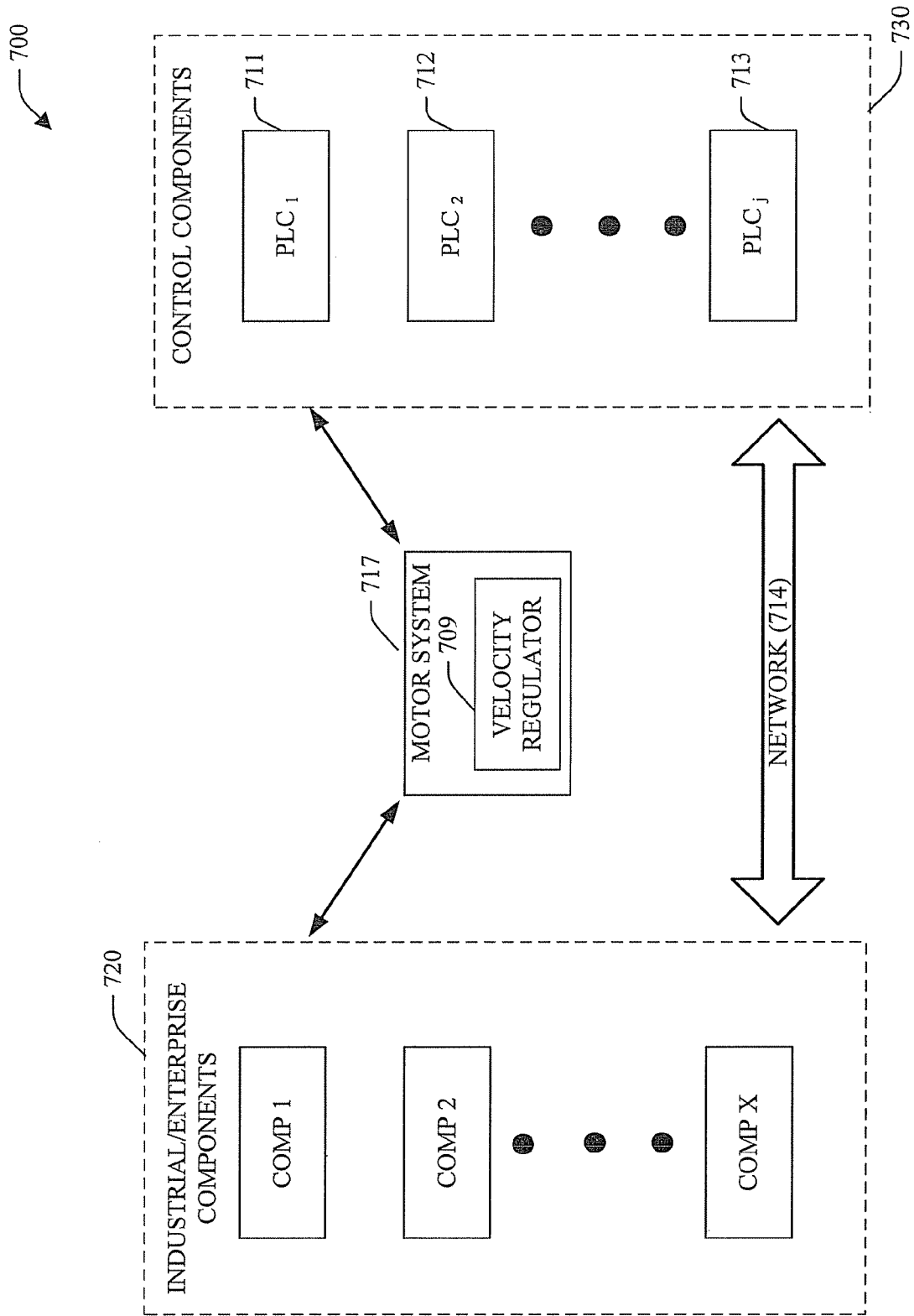
FIG. 7 illustrates an industrial system that employs frequency identification for associated motors in accordance with an aspect of the subject innovation.

FIG. 7 illustrates a block diagram for a motor system 717 that employs outputs of a velocity regulator 709 to determine resonant frequency identification in accordance with an aspect of the subject innovation. As explained in detail infra by employing such output of the velocity regulator for resonant frequency identification—(as opposed to other signals such as the velocity feedback signal)—inaccuracies such as those from gain amplifications, filtering and the like can be mitigated, to clearly indicate the resonant frequency of the system. The velocity regulator 709 enables the motor drive to command the rotation of the motor at predetermined rotations, by setting rotational speeds of the motor, for example.

Functional blocks for control algorithm of the motor system 717 can be part of applications running with/or on the control components 711, 712, 713 (1 to j, j being an integer) which can function as a management control center for the industrial network system 700. Accordingly, a framework is provided, wherein output from the velocity regulator can be collected based on triggering events, which can be set in accordance with predetermined criteria (e.g., motor requirements, load, and the like).

A network system 714 can be associated with the industrial automation system 700. The network system 714 can further include additional hosts (not shown), which may be personal computers, servers or other types of computers. Such hosts generally can be capable of running or executing one or more application-level (or user-level) programs, as well as initiating an I/O request (e.g., I/O reads or writes). In addition, the network system can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters.

It is noted that as used in this application terms such as "component," "model, " and the like—in addition to electro mechanical entities are intended to refer to a computer-related entity, either hardware, a combination of hardware and software, software, or software in execution as applied to an automation system for industrial control For example, in addition to mechanical/electrical units a component may be, but is not limited to being, a process running on a processor, a processor, an object, an executable, a thread of execution, a program and a computer. By way of illustration, both an application running on a server and the server can be components. One or more components can reside within a process and/or thread of execution and a component may be localized on one computer and/or distributed between two or more computers, industrial controllers, and/or modules communicating therewith.

Figure 8:
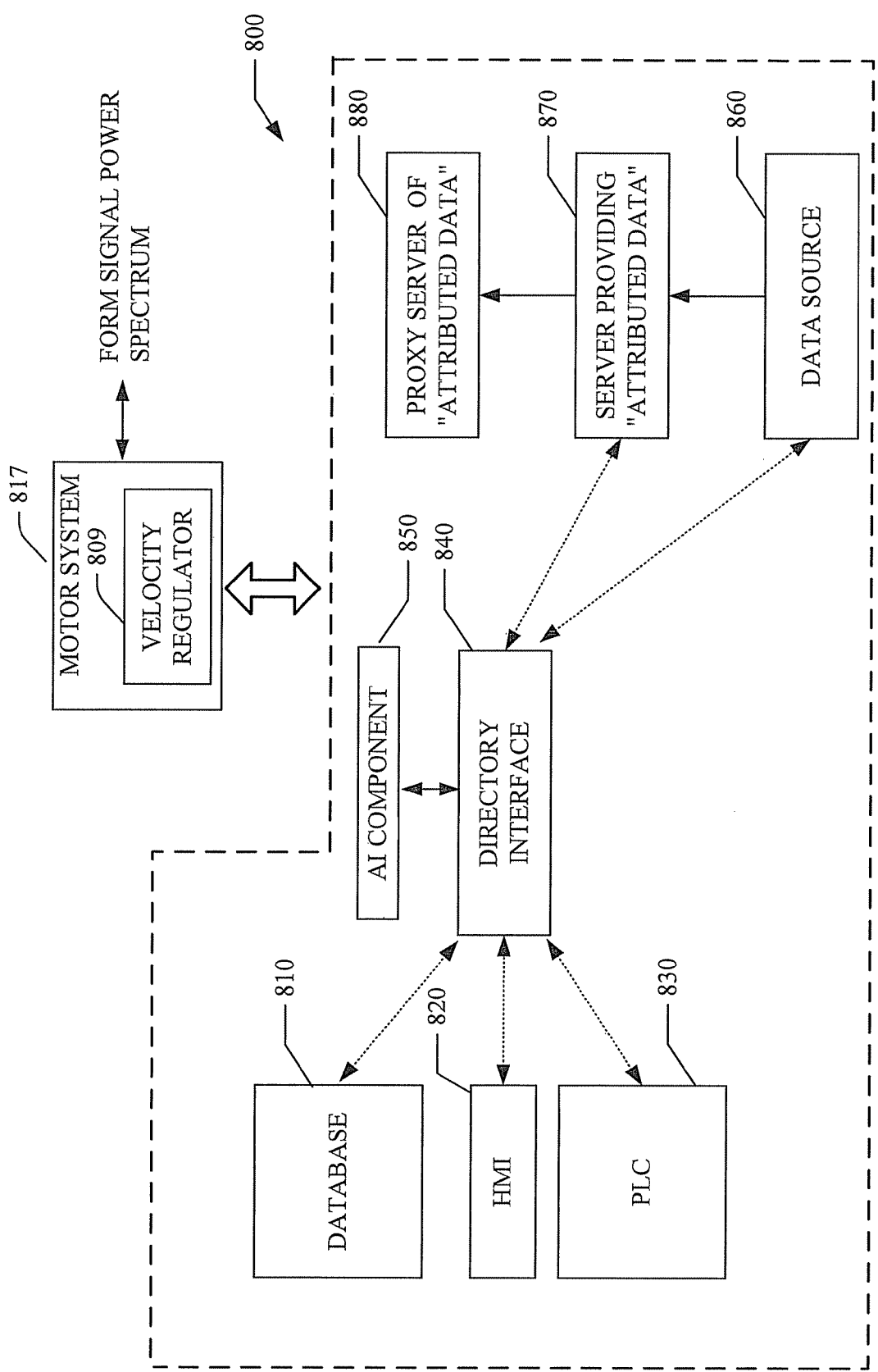
FIG. 8 illustrates a further industrial system that employs a signal power spectrum in accordance with an aspect of the subject innovation.

FIG. 8 illustrates an exemplary industrial automation network that forms a signal power spectrum via outputs of a velocity regulator 809 in accordance to an aspect of the subject innovation. The industrial setting 800 can include a database 810, a human machine interface (HMI) 820 and a programmable logic controller (PLC) 830, and a directory interface 840. The velocity regulator 809 can further associate with an Artificial Intelligence (AI) component 850 to facilitate determination of resonant frequency of the motor system in accordance with an aspect of the subject innovation.

For example, in connection with analyzing data collected from the velocity regulator and/or defining constants and variables that relate to applying the excitation signal, the subject invention can employ various artificial intelligence schemes. A process for learning explicitly or implicitly which data points should be collected and subject to an FFT, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

The subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=\text{confidence}(\text{class})$. As shown in FIG. 8, the artificial intelligence (AI) component 850 can be employed to facilitate inferring and/or determining when, where, how to initiate a download from the plurality of embedded historians to the central plant historian. The AI component 850 can employ any of a variety of suitable AI-based schemes as described supra in connection with facilitating various aspects of the subject invention.

In addition, the directory interface 840 can be employed to provide data from an appropriate location such as the data source 860, a server 870 and/or a proxy server 880. Accordingly, the directory interface 840 can point to a source of data based upon role and requirements (needs) of a requester (e.g., database 810, HMI 820, PLC 830, and the like.) The database 810 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. In this regard, particular ERP applications may require data that has certain desired attributes associated therewith. Thus, in accordance with an aspect of the subject invention, the directory interface 840 can provide data to the database 810 from the server 870, which provides data with the attributes desired by the database 810.

Moreover, the HMI 820 can employ the directory interface 840 to point to data located within the system 800. The HMI 820 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 820 can request data to have particular visualization attributes associated with data in order to easily display such data thereto. For example, the HMI 820 can query the directory interface 840 for a particular data point that has associated visualization attributes. The directory interface 840 can determine the proxy server 780 contains the attributed data point with the desired visualization attributes. For instance, the attributed data point can have a particular graphic that is either referenced or sent along with the data such that this graphic appears within the HMI environment instead of or along with the data value.

As explained earlier, the PLC 830 can be any number of models such as Allen Bradley PLC5, SLC-500, MicoLogix, and the like. The PLC 830 is generally defined as a specialized device employed to provide high-speed, low-level control of a process and/or system. The PLC 830 can be programmed using ladder logic or some form of structured language. Typically, the PLC 830 can utilize data directly from a data source (e.g., data source 860) that can be a sensor, encoder, measurement sensor, switch, valve and the like. The data source 860 can provide data to a register in a PLC and such data can be stored in the PLC if desired. Additionally, data can be updated (e.g., based on a clock cycle) and/or output to other devices for further processing.

Figure 9:
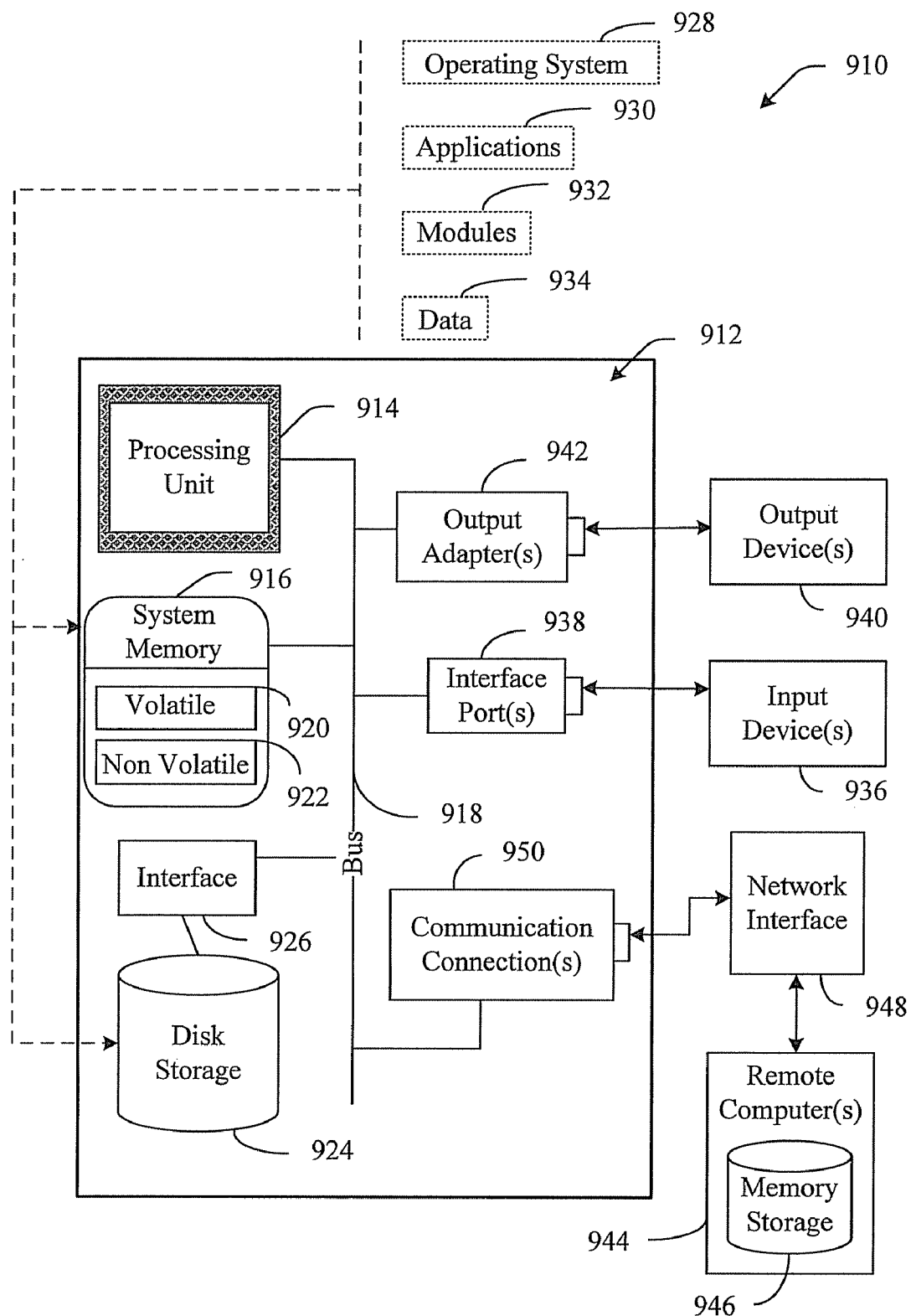
FIG. 9 illustrates an exemplary computing environment that can be implemented as part of a resonant identification in accordance with an aspect of the subject innovation.

FIG. 9 illustrates an exemplary environment 910 for implementing various aspects of the data capture unit, which can include computer 912, as part of the velocity regulator to determine a resonant frequency signal spectrum in accordance with an aspect of the subject innovation. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Figure 10:
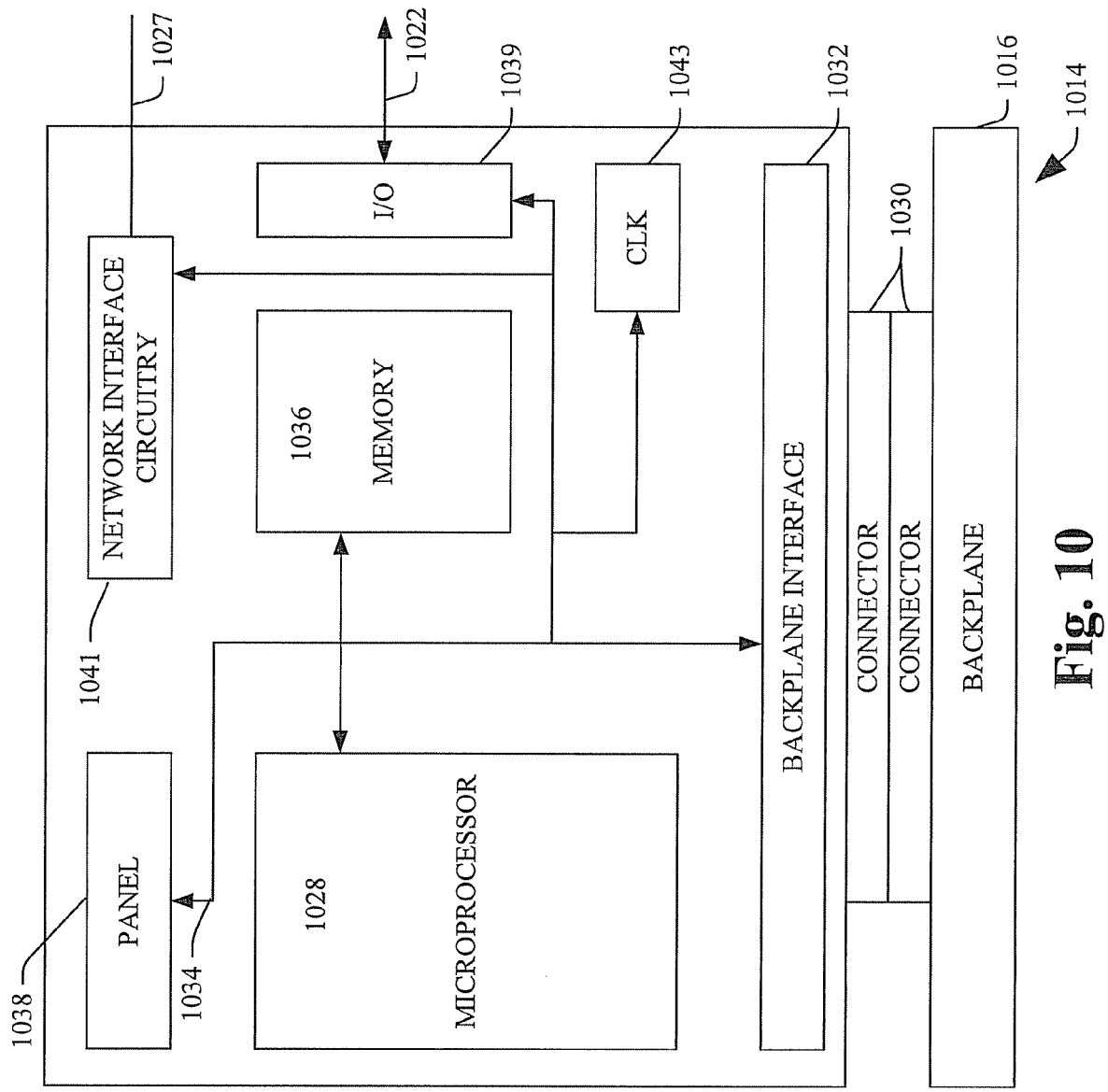
FIG. 10 illustrates an industrial setting with a backplane and associated modules that can employ a signal power spectrum in accordance with an aspect of the subject innovation.

FIG. 10 also illustrates an exemplary environment that can employ outputs from a velocity regulator as part of a motor system, to determine resonant frequency in accordance with an aspect of the subject innovation. Each functional module 1014 is attached to the backplane 1016 by means of a separable electrical connector 1030 that permits the removal of the module 1014 from the backplane 1016 so that it may be replaced or repaired without disturbing the other modules 1014. The backplane 1016 provides the module 1014 with both power and a communication channel to the other modules 1014. Local communication with the other modules 1014 through the backplane 1016 is accomplished by means of a backplane interface 1032 which electrically connects the backplane 1016 through connector 1030. The backplane interface 1032 monitors messages on the backplane 1016 to identify those messages intended for the particular module 1014, based on a message address being part of the message and indicating the message destination. Messages received by the backplane interface 1032 are conveyed to an internal bus 1034 in the module 1014.

The internal bus 1034 joins the backplane interface 1032 with a memory 1036, a microprocessor 1028, front panel circuitry 1038, I/O interface circuitry 1039 and communication network interface circuitry 1041. The microprocessor 1028 can be a general purpose microprocessor providing for the sequential execution of instructions included within the memory 1036 and the reading and writing of data to and from the memory 1036 and the other devices associated with the internal bus 1034. The microprocessor 1028 includes an internal clock circuit (not shown) providing the timing of the microprocessor 1028 but may also communicate with an external clock 1043 of improved precision. This clock 1043 may be a crystal controlled oscillator or other time standard including a radio link to an external time standard. The precision of the clock 1043 may be recorded in the memory 1036 as a quality factor. The panel circuitry 1038 includes status indication lights such as are well known in the art and manually operable switches such as for locking the module 1014 in the off state.

The memory 1036 can comprise control programs or routines executed by the microprocessor 1028 to provide control functions, as well as variables and data necessary for the execution of those programs or routines. For I/O modules, the memory 1036 may also include an I/O table holding the current state of inputs and outputs received from and transmitted to the industrial controller via the I/O modules.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
   a velocity regulator associated with a motor system;
   a time stamp component that applies a time stamp to one or more outputs of the velocity regulator; and
   a power signal spectrum formed via the one or more time stamped outputs of the velocity regulator, the power signal spectrum for determination of resonant frequency of the motor system.

2. The industrial automation system of claim 1 further comprising a current regulator as part of the motor system to set a torque thereof.

3. The industrial automation system of claim 1 further comprising an excitation component that applies an excitation signal to the motor system for determination of the resonant frequency.

4. The industrial automation system of claim 3, the excitation signal is in form of a sinusoidal wave.

5. The industrial automation system of claim 1, the motor system further comprising a motor and a drive.

6. The industrial automation system of claim 5 further comprising a position sensor associated with the motor.

7. The industrial automation system of claim 5 further comprising a controller configuration system to define process execution via functional blocks.

8. The industrial automation system of claim 5 further comprising a Human Machine Interface (HMI) to graphically display a view of the industrial automation system.

9. The industrial system of claim 8, the motor system associated with at least one of a controller, a server, or a sensor.

10. The industrial system of claim 9 further comprising a directory to track source of data.

11. The industrial automation system of claim 1 further comprising a transformation component that applies a Fast Fourier Transform to the one or more time stamped outputs of the velocity regulator.

12. The industrial automation system of claim 1 further comprising an artificial intelligence component that infers the resonant frequency of the motor system based in part on an analysis of the one or more time stamped outputs from the velocity regulator.

13. A method of determining a resonant frequency comprising:
   measuring a signal from an output of a velocity regulator associated with a motor system;
   time stamping the output of the velocity regulator; and
   creating a signal power spectrum from the time stamped output of the velocity regulator.

14. The method of claim 13 further comprising applying an excitation signal to the motor system in form of a sinusoidal wave form.

15. The method of claim 14 further comprising applying a Fast Fourier Transformation to the time stamped output of the velocity regulator.

16. The method of claim 14 further comprising defining at least one of constants or variables associated with the excitation signal.

17. The method of claim 16 wherein, the at least one of constants or variables includes at least one of data points to be collected, frequency range of interest, high and low frequencies, or characteristics of the excitation signal.

18. The method of claim 13 further comprising determining a resonant frequency of the motor system from the signal power spectrum.

19. The method of claim 13 further comprising employing a directory to track source of data.

20. The method of claim 13 further comprising gathering the output in response to a triggering event.

21. The method of claim 13 further comprising
   collecting the time stamped output data for obtaining the signal power spectrum; and
   determining whether the collected data is sufficient to obtain the signal power spectrum.

22. A computer implemented system comprising the following computer executable components:
   an excitation component that applies an excitation signal to a velocity regulator of a motor system; and
   a component that determines a resonant frequency of the motor system via time stamped outputs of the velocity regulator.

23. The computer implemented system of claim 22 further comprising a transformation component that applies a Fast Fourier Transform to the time stamped output of the velocity regulator.

24. The computer implemented system of claim 22 further comprising storage medium that stores time stamped data from output of the velocity regulator.

25. An industrial automation system, comprising:
- regulating means for regulating velocity of associated with a motor;
- means for forming a power signal spectrum via an output of the regulating means; and
- means for time stamping the output of the regulating means.

26. The industrial automation system of claim 25 further comprising current regulating means as part of the motor to set a torque thereof.

27. The industrial automation system of claim 25 further comprising means for applying a signal to the motor system.

28. The industrial automation system of claim 25 further comprising means for sensing a position of the motor.

29. The industrial automation system of claim 25 further comprising means for displaying a view of the industrial automation system.

30. The industrial automation system of claim 29 further comprising means for tracking source of data within the industrial automation system.

* * * * *

UNITED STATES PATENT AND TRADEMARK OFFICE
CERTIFICATE OF CORRECTION

PATENT NO. : 7,659,683 B2
APPLICATION NO. : 11/669048
DATED : February 9, 2010
INVENTOR(S) : Zhengrong Li et al.

It is certified that error appears in the above-identified patent and that said Letters Patent is hereby corrected as shown below:

In column 7, line 56, delete "Al-based" and replace with "AI-based," therefor.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,659,683 B2 Page 1 of 1
APPLICATION NO. : 11/669048
DATED : February 9, 2010
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this

Thirtieth Day of November, 2010

David J. Kappos
*Director of the United States Patent and Trademark Office*